(12) United States Patent
DeFranks et al.

(10) Patent No.: US 11,089,879 B2
(45) Date of Patent: Aug. 17, 2021

(54) TEMPERATURE MANAGEMENT BEDDING SYSTEMS

(71) Applicant: Dreamwell, Ltd., Atlanta, GA (US)

(72) Inventors: Michael Stephen DeFranks, Atlanta, GA (US); Richard F. Gladney, Fairburn, GA (US); Sheri L. McGuire, Duluth, GA (US); James G. Ruehlmann, Atlanta, GA (US)

(73) Assignee: DREAMWELL, LTD., Doraville, GA (US)

( * ) Notice: Subject to any disclaimer, the term of this patent is extended or adjusted under 35 U.S.C. 154(b) by 488 days.

(21) Appl. No.: 16/157,596

(22) Filed: Oct. 11, 2018

(65) Prior Publication Data

US 2020/0113345 A1    Apr. 16, 2020

(51) Int. Cl.
  *A47C 27/00* (2006.01)
  *A47C 31/00* (2006.01)
  (Continued)

(52) U.S. Cl.
  CPC .......... *A47C 27/007* (2013.01); *A47C 21/046* (2013.01); *A47C 27/122* (2013.01); *A47C 31/001* (2013.01); *B32B 5/022* (2013.01); *B32B 5/06* (2013.01); *B32B 5/18* (2013.01); *B32B 5/245* (2013.01); *B32B 5/26* (2013.01); *D04H 1/587* (2013.01); *D04H 1/74* (2013.01); *D06M 11/71* (2013.01); *D06M 11/83* (2013.01); *D06M 15/263* (2013.01); *A43B 7/149* (2013.01); *B32B 2250/20* (2013.01); *B32B 2255/02* (2013.01); *B32B 2255/205* (2013.01); *B32B 2255/26* (2013.01); *B32B 2255/28* (2013.01); *B32B 2262/062* (2013.01); *B32B 2307/3065* (2013.01); *B32B 2307/728* (2013.01); *B32B 2437/02* (2013.01); *B32B 2479/00* (2013.01); *D04H 1/425* (2013.01); *D06M 2101/06* (2013.01); *D06M 2200/30* (2013.01); *D10B 2401/022* (2013.01); *D10B 2503/06* (2013.01)

(58) Field of Classification Search
  CPC ... A47C 27/007; A47C 31/001; A47C 27/122; A47C 21/046; D06M 11/71; D06M 11/83; D06M 15/263; B32B 5/06; B32B 5/18; B32B 5/022; B32B 5/245; B32B 5/26; D04H 1/74; D04H 1/587
  See application file for complete search history.

(56) References Cited

U.S. PATENT DOCUMENTS 4,254,177 A * 3/1981 Fulmer ................... B32B 27/40
                                                     428/305.5
5,702,801 A * 12/1997 Chien ..................... D04H 1/74
                                                     156/181

(Continued)

*Primary Examiner* — Eric J Kurilla
(74) *Attorney, Agent, or Firm* — Cantor Colburn LLP

(57) ABSTRACT

Temperature management bedding systems for mattresses and quilt panels generally include a trilayer of active components including a phase change material applied to a top surface of a flexible substrate thereof, a fire retardant layer underlying the flexible substrate including hydrophilic rayon fibers treated with ammonium polyphosphate; and a vertically oriented fiber batting layer underlying the first retardant layer including an elastomeric binder. The temperature management bedding systems provide heat control and mass transfer of moisture from the bedding surface.

29 Claims, 1 Drawing Sheet

(51) Int. Cl.

| | | |
|---|---|---|
| *A47C 27/12* | (2006.01) | |
| *B32B 5/06* | (2006.01) | |
| *B32B 5/02* | (2006.01) | |
| *A47C 21/04* | (2006.01) | |
| *D06M 11/71* | (2006.01) | |
| *B32B 5/18* | (2006.01) | |
| *B32B 5/24* | (2006.01) | |
| *B32B 5/26* | (2006.01) | |
| *D06M 11/83* | (2006.01) | |
| *D06M 15/263* | (2006.01) | |
| *D04H 1/74* | (2006.01) | |
| *D04H 1/587* | (2012.01) | |
| *A43B 7/14* | (2006.01) | |
| *D06M 101/06* | (2006.01) | |
| *D04H 1/425* | (2012.01) | |

(56) References Cited

U.S. PATENT DOCUMENTS

| | | | | |
|---|---|---|---|---|
| 5,837,002 A | * | 11/1998 | Augustine | A47C 21/044 607/104 |
| 7,096,528 B2 | * | 8/2006 | Gladney | A47C 23/0431 5/716 |
| D621,197 S | * | 8/2010 | Gladney | D6/605 |
| 9,642,471 B2 | * | 5/2017 | Curos Santaeularia | D02G 3/443 |
| 2003/0109908 A1 | * | 6/2003 | Lachenbruch | A47C 27/148 607/96 |
| 2004/0158928 A1 | * | 8/2004 | Gladney | A47C 31/001 5/698 |
| 2007/0135878 A1 | * | 6/2007 | Lachenbruch | A47C 21/046 607/108 |
| 2007/0261173 A1 | * | 11/2007 | Schlussel | A47C 31/006 5/725 |
| 2007/0298668 A1 | * | 12/2007 | DeFranks | A47C 31/001 442/59 |
| 2008/0050565 A1 | * | 2/2008 | Gross | D04H 1/425 428/212 |
| 2010/0175196 A1 | * | 7/2010 | Lafleche | A61G 7/05784 5/707 |
| 2011/0016635 A1 | * | 1/2011 | Svensrud | A47C 31/007 5/724 |
| 2012/0023664 A1 | * | 2/2012 | Joo | A47C 21/042 5/421 |
| 2015/0096125 A1 | * | 4/2015 | DeFranks | D04H 1/02 5/698 |
| 2015/0147518 A1 | * | 5/2015 | DeFranks | D04H 1/4382 428/96 |
| 2015/0296994 A1 | * | 10/2015 | Mikkelsen | A47C 21/042 5/655.4 |
| 2016/0235215 A1 | * | 8/2016 | Lowe | A47C 21/044 |
| 2017/0020299 A1 | * | 1/2017 | Valenta | A47C 27/002 |
| 2017/0231401 A1 | * | 8/2017 | McGuire | A47C 31/001 5/698 |
| 2018/0049914 A1 | * | 2/2018 | Stewart | A61F 7/02 |
| 2018/0249843 A1 | * | 9/2018 | DeFranks | B68G 3/00 |
| 2019/0053633 A1 | * | 2/2019 | Rensink | A47C 27/148 |
| 2020/0260882 A1 | * | 8/2020 | Chunglo | A61F 7/02 |
| 2021/0070606 A1 | * | 3/2021 | Corodemus | A47C 27/088 |

* cited by examiner

TEMPERATURE MANAGEMENT BEDDING SYSTEMS

BACKGROUND

The present disclosure generally relates to temperature management bedding systems involving heat control and mass transfer of moisture from a sleeping surface.

One of the ongoing problems associated with mattress assemblies is user comfort. To address user comfort, mattresses are often fabricated with multiple layers having varying properties such as density and hardness, among others, to suit the needs of the intended user. One particular area of concern to user comfort is the level of heat buildup in the mattress and experienced by the user after a period of time. Additionally, some mattresses can retain a high level of moisture, further causing discomfort to the user and potentially leading to foul odors. The problems can be experienced, to some extent, in pocketed coil and innerspring assembly mattresses, as well as foam mattresses. For example, foam mattresses such as those formed of polyurethane foam, latex foam, and the like, are generally known in the art. Manufacturers have employed so called memory foam, also commonly referred to as viscoelastic foams, which are generally a combination of polyurethane and one or more additives that increase foam density and viscosity, thereby increasing its viscoelasticity. These foams are often open cell foam structures having both closed and open cells but in some instances may be reticulated foam structures. The term "reticulated" generally refers to a cellular foam structure in which the substantially all of the membrane windows are removed leaving a skeletal structure. In contrast, open cell structures include both open cell (interconnected cells) and closed cells.

Unfortunately, the high density of foams used in current mattress assemblies, particularly those employing memory foam layers, generally prevents proper ventilation. As a result, the foam material can exhibit an uncomfortable level of heat to the user after a period of time. The human body is extremely good at maintaining homeostasis and we are (in most cases) generally constant emitters of heat. Humans thermoregulate heat (insulate or radiate) through the control of blood flow through capillaries in the skin. When heat generated by the body cannot effectively be radiated to the environment, we begin to perspire. Prior to active perspiration, sweat is vaporized by our body heat and absorbed into the air. Resultant to this process, we are evaporatively cooled. Initially, the sleep environment is sufficiently cool and dry to absorb this heat and moisture; however, as temperature and humidity levels rise, we begin to actively perspire and we exit the thermoneutral zone.

BRIEF SUMMARY

Embodiments of the present invention are generally directed to quilt panels and mattresses including the quilt panels including a temperature management system for heat and mass transfer. A non-limiting example of a quilt panel in accordance with one or more aspects of the present invention includes a top fabric layer; a trilayer of active components including a phase change material applied to a top surface of a flexible substrate thereof, a fire retardant layer underlying the flexible substrate including hydrophilic rayon fibers treated with ammonium polyphosphate; and a vertically oriented fiber batting layer underlying the first retardant layer including an elastomeric binder; and a bottom layer, wherein the top fabric layer and the bottom layer are joined at least about a perimeter thereof and encapsulate the trilayer of active components.

A non-limiting example of a mattress in accordance with one or more aspects of the present invention includes a mattress core; and a quilt panel coupled to the mattress core. The quilt panel includes a top fabric layer; a trilayer of active components including a phase change material applied to a top surface of a flexible substrate thereof, a fire retardant layer underlying the flexible substrate including hydrophilic rayon fibers treated with ammonium polyphosphate; and a vertically oriented fiber batting layer underlying the first retardant layer including an elastomeric binder; and a bottom layer, wherein the top fabric layer and the bottom layer are joined at least about a perimeter thereof and encapsulate the trilayer of active components.

The disclosure may be understood more readily by reference to the following detailed description of the various features of the disclosure and the examples included therein.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
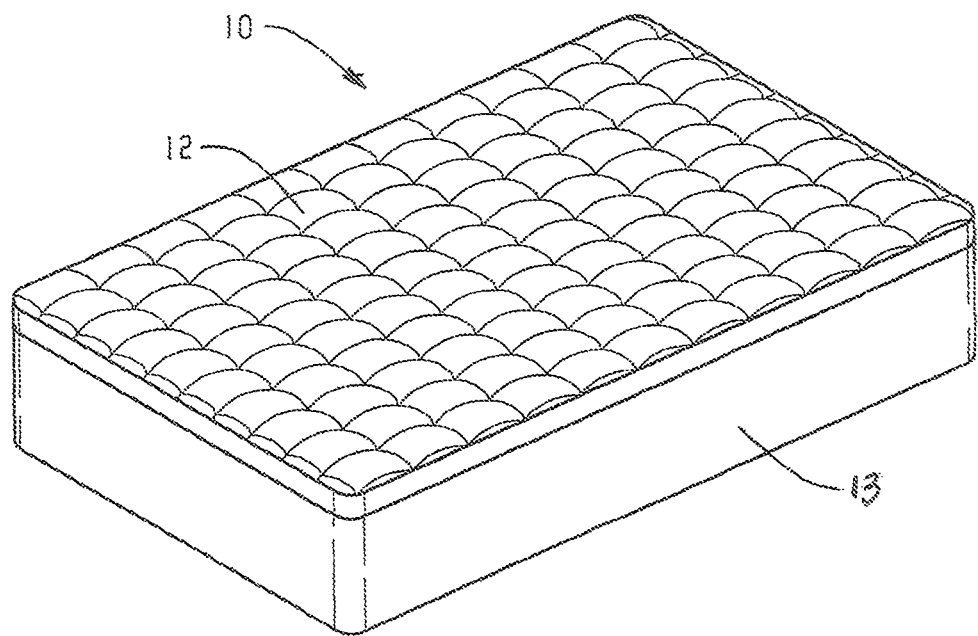
FIG. 1 illustrates a perspective view of temperature management bedding system in accordance with an embodiment of the present disclosure.

It will be appreciated that for simplicity and clarity of illustration, elements shown in the drawings have not necessarily been drawn to scale. For example, the dimensions of some of the elements can be exaggerated relative to other elements for purpose of clarity.

DETAILED DESCRIPTION

Disclosed herein are temperature management bedding systems. Temperature management of a mattress in accordance with the present disclosure generally involves heat and mass transfer. The human body efficiently maintains homeostasis by constantly emitting heat. Humans thermoregulate heat (insulate or radiate) through the control of blood flow through capillaries proximate to the skin. When the heat cannot be effectively radiated to the environment, humans begin to perspire. Prior to active perspiration, sweat is vaporized by body heat and absorbed into the external environment, which results in evaporative cooling. Initially, sleep environments are sufficiently cool and dry so as to actively absorb heat and moisture. However, as temperature and humidity levels rise, active perspiration occurs and the thermoneutral zone is exited.

As will be described in greater detail below, the temperature management bedding systems in accordance with one or more embodiments of the present invention includes a trilayer of active components for managing heat and mass transfer through capacitive, conductive, and convective means while the mass transfer of moisture can be managed through capillary action of purposefully selected fibers. The temperature management bedding systems of the present disclosure including the trilayer of active components can be contained within a quilt panel, which is intimately positioned under an end user to ensure high performance and high efficiency. The trilayer of active components can be sandwiched between an outer fabric layer and a backing layer of the quilt panel. Additional optional layers such as foam and/or fibers and/or fabrics can be provided within the quilt panel depending on the intended application.

In one or more embodiments, the trilayer of active components can include a first layer including a phase change material (PCM), a fire retardant second layer including hydrophilic rayon fibers treated with ammonium polyphosphate, and a third layer of vertically oriented fiber with an elastomeric binder. The fire retardant layer can further include silver ions for additional thermal conductivity and antimicrobial resistance, wherein the rayon fibers provide improved comfort by moisture wicking. Moreover, the first retardant second layer can be vertically oriented or horizontally oriented (i.e., carded and crosslapped) as may be desired for different applications. The quilt panel including the trilayer of active components as described above provides a cost effective solution to addressing the issues associated with both heat transfer and mass transfer.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

For the sake of brevity, conventional techniques related to making and using aspects of the invention may or may not be described in detail herein. Accordingly, in the interest of brevity, many conventional implementation details are only mentioned briefly herein or are omitted entirely without providing the well-known system and/or process details.

Figure 2:
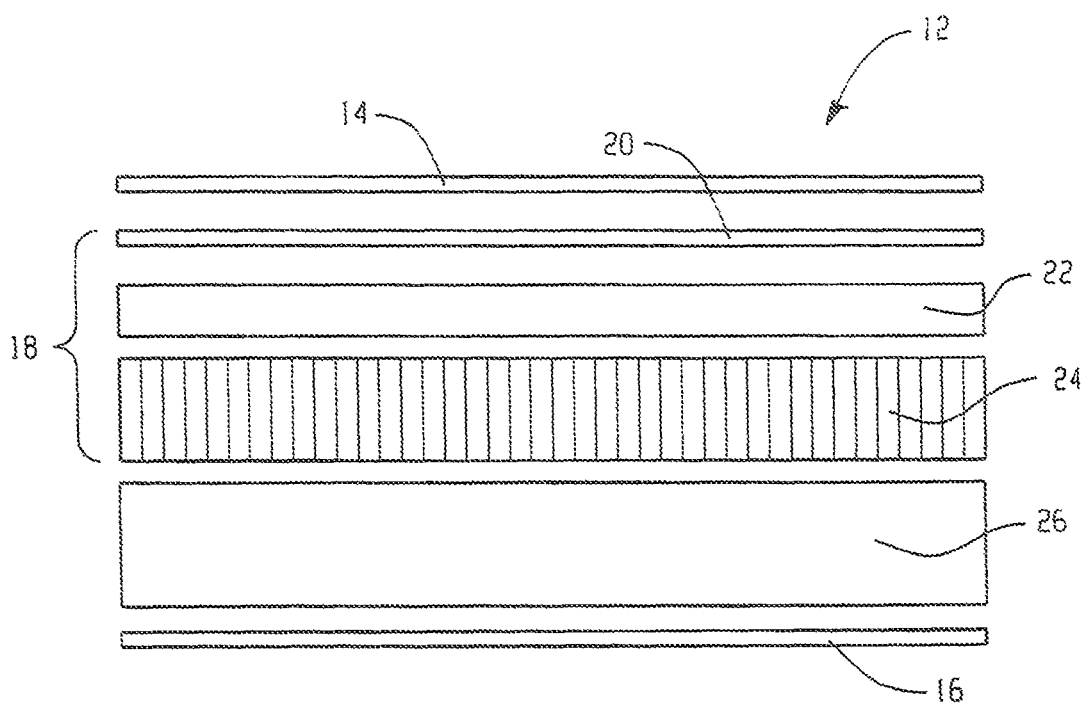
FIG. 2 illustrates a cross-sectional view of an exemplary quilt panel including a trilayer of active components in accordance with the disclosure.

Referring now to FIGS. 1-2, there is depicted a mattress assembly 10 including an exemplary quilt panel layer 12 overlying a mattress core 13. The mattress core 13 is not intended to be limited and may include one or more foam layers, a coil innerspring layer, and various combinations thereof as is generally practiced in the art.

As shown more clearly in FIG. 2, the quilt panel layer 12 is the uppermost layer of a mattress assembly 10 and provides direct contact with the end user when in use. Thus, the quilt panel 12 provides the end user with the immediate perception of softness or "feel" experienced by the end user. Each quilt panel layer 12 commonly includes a top fabric layer 14 and a bottom layer of mesh or cloth or backing material 16. The top fabric layer 14 and bottom layer 16 are stitched about at least the perimeter and encapsulate multiple layers therebetween to define a particular quilt panel 12. As noted above, the quilt panel 12 in accordance with the present invention includes at least a trilayer 18 of active components sandwiched between the top fabric layer 14 and the bottom layer 16. The quilt panel can be attached to the mattress core in a manner generally practiced in art and is not intended to be limited to any particular attachment means.

The trilayer 18 of active components includes a first layer 20 including a phase change material applied to a top surface of a flexible substrate thereof, i.e., directly beneath or proximate to the bottom surface of the outer fabric layer 14; a fire retardant second layer 22 including hydrophilic rayon fibers, horizontally or vertically oriented, treated with ammonium polyphosphate and in some embodiments, silver ions; and a vertically oriented fiber batting third layer 24 including an elastomeric binder. The first layer 20 represents the uppermost layer of the trilayer of active components 18, the fire retardant second layer 22 represents an intermediate layer of the trilayer 18, and the vertically oriented fiber batting layer 24 represents the bottommost layer of the trilayer 18.

In addition to the trilayer 18 of active components, the quilt panel 12 can optionally include one or more foam layers, fiber layers, fabric layers or combinations thereof. The optional one or more foam layers, fiber layers, or combinations thereof can be provided above and/or below the trilayer of active components 18 depending on the particular application.

The phase change material (PCM) layer can be coated directly onto a flexible substrate such as a non-woven layer, foam layer, a fiber layer, a fabric layer, or combinations thereof. In one or more embodiments, the PCM is coated onto an upper surface of the flexible substrate facing the end user when in use. The term "non-woven" as used herein in connection with fabrics, fibrous compositions, textiles, materials, products and similar items means a structure that is produced by attaching, bonding and/or interlocking two or more of the same or different components, such as filaments, microfibers, fibers, fibrous compositions, threads or yarns, together, generally by loosely bonding them together, and using one or more of a variety of techniques that generally does not involve weaving or interlacing, but employs mechanical, chemical, thermal and/or solvent means, for example, using known needle punching, melt-blowing, spun bonding, wet-forming and various bonded carded web processes. Non-woven materials may be manufactured using fusing or chemical bonding techniques (with the use of binding agents, such as PVA or polyester) or similar techniques, which are known by those of skill in the art. This term generally does not include fabrics, textiles, fibrous compositions or materials that are woven, knitted, tufted, or those using felting processes.

PCMs generally operate on the principle that a material requires a relatively significant amount of energy (heat) to change from a solid to a liquid and then back from a liquid to a solid. PCMs can therefore absorb large amounts of heat or energy from their environment and return large amounts of heat to their environment. This effective absorption, store and release of heat can be used to help regulate the temperature of an environment.

In one or more embodiments, suitable PCMs include, without limitation, microencapsulated PCMs. Any of a variety of processes known in the art may be used to microencapsulate PCMs. One of the most typical methods which may be used to microencapsulate a PCM is to disperse droplets of the molten PCM in an aqueous solution and to form walls around the droplets using techniques such as coacervation, interfacial polymerization, or in situ polymerization, all of which are well known in the art. For example, the methods are well known in the art to form gelatin capsules by coacervation, polyurethane or polyurea capsules by interfacial polymerization, and urea-formaldehyde, urea-resorcinol-formaldehyde, and melamine formaldehyde capsules by in situ polymerization. The microencapsulated PCMs can then be dispersed in a liquid vehicle such as a gel and applied to the above noted surfaces or substrate.

Encapsulation of the PCM creates a tiny, microscopic container for the PCM. This means that regardless of whether the PCM is in a solid state or a liquid state, the PCM will be contained. The size of the microcapsules typically range from about 1 to 100 microns and more typically from about 2 to 50 microns. The capsule size selected will depend on the application in which the microencapsulated PCM is used.

The microcapsules will typically have a relatively high payload of phase change material, typically at least 70% by weight, more typically at least 80% by weight, and in accordance with some embodiments, the microcapsules may contain more than 90% phase change material.

Gelling agents useful in the present disclosure include polysaccharides, nonionic polymers, inorganic polymers, polyanions and polycations. Examples of polysaccharides useful in the present disclosure include, but are not limited to, alginate and natural ionic polysaccharides such as chitosan, gellan gum, xanthan gum, hyaluronic acid, heparin, pectin and carrageenan. Examples of ionically crosslinkable polyanions suitable for use in the practice of the present invention include, but are not limited to, polyacrylic acid and polymethacrylic acid. Ionically crosslinkable polycations such as polyethylene imine and polylysine are also suitable for use in the present invention. A specific example of a non-ionic polymer is polyvinylalcohol. Sodium silicates are examples of useful inorganic polymers.

The gelling agents are typically provided as an aqueous solution at a concentration and viscosity sufficient to provide the desired amount of coating on the microcapsules. The technology of microencapsulation is known to those skilled in the art as is the routine optimization of these parameters for the gelling agent.

The microencapsulated PCM can be dispersed in a liquid vehicle such as a gel and applied to a surface of the substrate. The surface application can include immersion coating, spray coating, or the like. The particular application method is not intended to be limited.

The particular PCM is not intended to be limited and can be inorganic or organic. Suitable inorganic PCMs include salt hydrates made from natural salts with water. The chemical composition of the salts is varied in the mixture to achieve required phase-change temperature. Special nucleating agents can be added to the mixture to minimize phase-change salt separation. Suitable organic PCMs include fatty acids, waxes (e.g., paraffins) or the like.

Advantageously, by providing the PCM layer as the first layer 20, the hand and/or softness of the fabric layer 12 is unaffected yet the end user experiences the benefits of the PCM. In contrast, prior art bedding systems typically applied the PCM to the outermost surface in contact with the end user leaving it tacky at times and prone to dirt accumulation and staining.

The fire retardant second layer 22 includes a plurality of hydrophilic rayon fibers, which can be horizontally or vertically oriented. The fibers are treated with an ammonium polyphosphate fire retardant and silver ions, which collectively provides fire retardancy, thermal conductivity, and antimicrobial properties in addition to the moisture wicking properties provided by the hydrophilic rayon fibers.

The silver ions may be added to the fibers using application methods known to those skilled in the art. In the various embodiments disclosed herein, the silver ions can be a silver polymer commercially available as a silver polymer emulsion from the Dow Corporation under the trade name SILVADUR. The aqueous antibacterial polymer emulsion generally includes, based on the dry weight of the emulsion, from 90 to 99.9 wt % of a polymer A comprising acrylic, styrene-acrylic, or vinyl acetate-acrylic emulsion polymers, from 0.025 to 2 wt % of an oxidant selected from peroxides, halic acids, hypohalous acids, halous acids, perhalic acids, their salts, and combinations thereof, and from 0.002 to 0.5 wt % of silver, wherein the silver is complexed with a copolymer B that comprises from 5 to 95 wt % a heterocyclic containing monomer residue. The silver polymer emulsion is described in detail in U.S. Pat. No. 8,858,926, incorporated herein by reference in its entirety.

The ammonium polyphosphate flame retardant may be applied using water or other solvents as a vehicle for uniformly distributing the ammonium polyphosphate after which the fibers can be centrifuged and dried. Exemplary application processes are disclosed in U.S. Pat. No. 7,736,696 to Tintoria-Piana, incorporated herein by reference in its entirety. The ammonium polyphosphate loading is generally at a loading of 13 to 20% based on a total weight of the fiber and the fire retardant.

By way of example, a closed-loop system and process can used for applying both the antimicrobial and the ammonium polyphosphate fire retardant chemicals to the fibers. The untreated rayon fibers are first positioned in a vessel such as a dye machine, which circulates the fire retardant and antimicrobial chemicals. The fire retardant and antimicrobial chemicals may be in the form of a solution, a dispersion or emulsion. In some embodiments, the fire retardant and antimicrobial chemicals are in the form of an aqueous solution. The fire retardant and antimicrobial chemical solution, dispersions, emulsion or otherwise may be at room temperature or at an elevated temperature. In most embodiments, the fire retardant chemical and antimicrobial solution, dispersions, emulsion or otherwise will be at a temperature from about 4° C. to about 100° C.; in other embodiments, from 20 to 50° C. and in still other embodiments, at about ambient temperature.

After absorption of the fire retardant and antimicrobial composition on and/or into the rayon fibers, non-absorbed fire retardant and/or antimicrobial chemicals are recovered and re-used on subsequent batches of fibers. In some embodiments, the re-use of fire retardant and/or antimicrobial chemicals can take place in the same vessel that is used to treat successive batches of fiber. Alternatively, recovery can be achieved by directing the non-absorbed fire retardant and antimicrobial composition into a second dye machine containing additional fibers, or by extracting the fire retardant composition by centrifugation or other means, or by a combination of the two processes. The treated fibers may then be rinsed and dried. Alternatively, the fire retardant and antimicrobial may be applied to the fibers at a subsequent stage of manufacturing, e.g., after blending with the binder fibers or forming the non-woven web, or after the non-woven web has been pleated. The treated fibers can be a carded and cross lapped nonwoven to form a horizontally oriented fiber layer or vertically oriented as may be desired in some embodiments.

In one or more embodiments, the fire retardant and antimicrobial are applied to lyocell rayon fibers. Advantageously, because of its high moisture absorption and fiber cross section, it has been discovered that the fire retardant and antimicrobial can be selected to permeate substantially throughout the cross sectional fiber structure unlike many types of fibers where the fire retardant coats exposed surfaces with minimal or no impregnation of the fire retardant into the fiber core. In one or more embodiments, ammonium polyphosphate can applied in addition to the antimicrobial to the lyocell fiber and has been found to permeate substantially throughout a cross section of the lyocell fiber.

The vertically oriented fiber batting layer 24 can be formed of any polymeric fiber and an elastomeric binder. The vertical orientation and the elastomeric binder provide resiliency and further enables convective currents to flow therethrough due to occupant movements to evaporate and manage mass transfer of moisture from the fire retardant layer 22. The increase in resiliency has been found to translate into higher levels of comfort and product durability. Still further, increased airflow was observed by orienting the fibers in the substantially vertical direction.

The vertically oriented fiber batting layer 24 may be formed using one of several processes for converting a source of fiber into vertically oriented fibers as is generally known in the art. By way of example, the vertically oriented fibers can be formed as described in U.S. Pat. No. 5,702,801, incorporated herein by reference in its entirety. In some embodiments, the peaks of the vertically oriented fibers in the batting layer may be brushed or needle punched to improve the entwining of individual fibers of one peak into adjacent peaks. Adjacent peaks of vertically oriented fibers may be of substantially the same height, or alternatively may have different heights in a repeating pattern.

In one or more embodiments, the vertically oriented fibers can be in the form of pleats as discussed above. The pleats are formed from a cross laid non-woven web of fibers that can be less than 5 millimeters (mm) (i.e., about 0.2 inches) thick before pleating and in other embodiments, about 2 mm thick (e.g., a mattress approximately 2000 mm long can have about 500 pleats, each or two sheets). As previously described above, in most embodiments, the fibers are 0.25 to 4 inches long. During manufacture, once pleated, the pleated layer can be cross-needled to provide additional structural strength.

The pleating can provide a pleated layer having a thickness less than about 2 inches. By means of a carding process when the fibers are laid, greater than 75%, and greater than 90% in other embodiments of the fibers of the non-woven web are aligned substantially vertically oriented relative to the plane defined by an underlying mattress or cushioning article, for example.

As noted above, the non-woven web or the pleated layer includes an elastomeric binder fiber, which bonds the fibers to form a fiber mat. The elastomeric binder fiber can be a bi-component fiber having a standard polyester core, e.g., having a melting point of about 250° C. within a low melting temperature polyester surround having a melting point of about 130° C. During manufacture, the non-woven web can be heat treated above the melting temperature of the fiber surround but beneath the temperature of the fiber core to cause the bi-component fibers to bind the fire retardant treated fibers. After pleating, the non-woven web can be cross-needled to enhance its strength. Optionally, the pleated layer may be cut during the manufacturing process as a result of the vertically lapped arrangement of fibers.

Due to the vertical arrangement of the fibers in the pleated layer, when a load is applied to the cushioned article, e.g., mattress, the vertical arrangement of the fibers in the layer supports the load in a spring-like manner, compressing vertically to accommodate the shape of the load without flattening in the neighboring regions. In effect, the vertically oriented fibers, e.g., the vertically lapped formed pleats, act as vertical springs with cross needling to effect limited attachment between pleats but without causing pleats to flatten except under load. Moreover, when load is removed, the vertically oriented fibers readily recover it shape due to the independently spring-like nature of the vertically oriented fibers.

The fibers may have varying diameter and denier, be hollow or solid, or may be crimped. Blending different types of fibers may further contribute to resiliency of the batting material. The amounts will vary generally depending on the fiber composition, and flame retardant employed.

Optionally, the quilt panel 12 can further include one or more additional layers 26, one of which is shown, within the quilt panel 12. The number of layers and locations of such layers are not intended to be limited and can vary depending on the desired comfort level, quality, and expense of the mattress. All of the different layers can be stitched together, typically in a conventional quilting machine (not shown) with thread, to form a quilt stitch pattern. The quilt stitch pattern holds the components of the layers together and provides a composite structure to the quilt panel layer.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A quilt panel comprising
   a top fabric layer;
   a trilayer of active components comprising
      a phase change material applied to a top surface of a flexible substrate thereof,
      a fire retardant layer underlying the flexible substrate including hydrophilic rayon fibers treated with ammonium polyphosphate; and
      a vertically oriented fiber batting layer underlying the first retardant layer including an elastomeric binder; and
   a bottom layer, wherein the top fabric layer and the bottom layer are joined at least about a perimeter thereof and encapsulate the trilayer of active components.

2. The quilt panel of claim 1, further comprising one or more layers intermediate the top fabric layer and the bottom layer.

3. The quilt panel of claim 1, wherein the phase change material is in the form of a coating on the flexible substrate.

4. The quilt panel of claim 3, wherein the flexible substrate comprises a fabric layer, foam layer, a fiber layer or a combination thereof.

5. The quilt panel of claim 3, wherein the flexible substrate is a non-woven substrate.

6. The quilt panel of claim 1, wherein the fire retardant layer comprises lyocell fibers.

7. The quilt panel of claim 1, wherein the fire retardant layer further comprises silver ions dispersed throughout.

8. The quilt panel of claim 7, wherein the silver ions comprise a polymer emulsion comprising, based on a dry weight of the emulsion, from 90 to 99.9 wt % of a polymer A comprising acrylic, styrene-acrylic, or vinyl acetate-acrylic emulsion polymers, from 0.025 to 2 wt % of an oxidant selected from peroxides, halic acids, hypohalous acids, halous acids, perhalic acids, their salts, and combinations thereof, and from 0.002 to 0.5 wt % of silver, wherein the silver ions are complexed with a copolymer B that comprises from 5 to 95 wt % a heterocyclic containing monomer residue.

9. The quilt panel of claim 1, wherein the ammonium polyphosphate is a loading of 13 to 20% based on a total weight of the fiber and the fire retardant.

10. The quilt panel of claim 1, wherein the vertically oriented fibers are in the form of pleats.

11. The quilt panel of claim 1, wherein the layer of vertically oriented fibers have a thickness greater than 0.5 inches to 3 inches.

12. The quilt panel of claim 1, wherein the fire retardant layer including the hydrophilic rayon fibers are carded and crosslapped.

13. The quilt panel of claim 1, wherein the fire retardant layer including the hydrophilic rayon fibers are vertically oriented.

14. The quilt panel of claim 1, wherein the silver ions comprises a polymer emulsion comprising, based on a dry weight of the emulsion, from 90 to 99.9 wt % of a polymer A comprising acrylic, styrene-acrylic, or vinyl acetate-acrylic emulsion polymers, from 0.025 to 2 wt % of an oxidant selected from peroxides, halic acids, hypohalous acids, halous acids, perhalic acids, their salts, and combinations thereof, and from 0.002 to 0.5 wt % of silver, wherein the silver is complexed with a copolymer B that comprises from 5 to 95 wt % a heterocyclic containing monomer residue.

15. The quilt panel of claim 1, wherein the quilt panel overlies a mattress structure, a seating structure, or is a cushion layer in a shoe structure.

16. A mattress comprising:
   a mattress core; and
   a quilt panel coupled to the mattress core, the quilt panel comprising a top fabric layer; a trilayer of active components comprising a phase change material applied to a top surface of a flexible substrate thereof, a fire retardant layer underlying the flexible substrate including hydrophilic rayon fibers treated with ammonium polyphosphate; and a vertically oriented fiber batting layer underlying the first retardant layer including an elastomeric binder; and a bottom layer, wherein the top fabric layer and the bottom layer are joined at least about a perimeter thereof and encapsulate the trilayer of active components.

17. The mattress of claim 16, further comprising one or more layers intermediate the top fabric layer and the bottom layer.

18. The mattress of claim 16, wherein the phase change material is in the form of a coating on the flexible substrate.

19. The mattress of claim 18, wherein the flexible substrate comprises a fabric layer, foam layer, a fiber layer or a combination thereof.

20. The mattress of claim 18, wherein the flexible substrate is a non-woven substrate.

21. The mattress of claim 16, wherein the fire retardant layer comprises lyocell fibers.

22. The mattress of claim 16, wherein the fire retardant layer further comprises silver ions dispersed throughout.

23. The mattress of claim 22, wherein the silver ions comprise a polymer emulsion comprising, based on a dry weight of the emulsion, from 90 to 99.9 wt % of a polymer A comprising acrylic, styrene-acrylic, or vinyl acetate-acrylic emulsion polymers, from 0.025 to 2 wt % of an oxidant selected from peroxides, halic acids, hypohalous acids, halous acids, perhalic acids, their salts, and combinations thereof, and from 0.002 to 0.5 wt % of silver, wherein the silver ions are complexed with a copolymer B that comprises from 5 to 95 wt % a heterocyclic containing monomer residue.

24. The mattress of claim 16, wherein the ammonium polyphosphate is a loading of 13 to 20% based on a total weight of the fiber and the fire retardant.

25. The mattress of claim 16, wherein the vertically oriented fibers are in the form of pleats.

26. The mattress of claim 16, wherein the layer of vertically oriented fibers have a thickness greater than 0.5 inches to 3 inches.

27. The mattress of claim 16, wherein the fire retardant layer including the hydrophilic rayon fibers are carded and crosslapped.

28. The mattress of claim 16, wherein the fire retardant layer including the hydrophilic rayon fibers are vertically oriented.

29. The mattress of claim 16, wherein the silver ions comprises a polymer emulsion comprising, based on a dry weight of the emulsion, from 90 to 99.9 wt % of a polymer A comprising acrylic, styrene-acrylic, or vinyl acetate-acrylic emulsion polymers, from 0.025 to 2 wt % of an oxidant selected from peroxides, halic acids, hypohalous acids, halous acids, perhalic acids, their salts, and combinations thereof, and from 0.002 to 0.5 wt % of silver, wherein the silver is complexed with a copolymer B that comprises from 5 to 95 wt % a heterocyclic containing monomer residue.

* * * * *